Sept. 18, 1951 J. M. KUHLIK 2,568,681

SOUND RECORDING AND REPRODUCING MACHINE

Filed Dec. 8, 1943 4 Sheets-Sheet 1

INVENTOR.
Jacob M. Kuhlik

Sept. 18, 1951 J. M. KUHLIK 2,568,681

SOUND RECORDING AND REPRODUCING MACHINE

Filed Dec. 8, 1943 4 Sheets-Sheet 2

INVENTOR.
Jacob M. Kuhlik

SOUND RECORDING AND REPRODUCING MACHINE

Filed Dec. 8, 1943 4 Sheets-Sheet 3

INVENTOR.
Jacob M. Kuhlik

SOUND RECORDING AND REPRODUCING MACHINE

Filed Dec. 8, 1943 4 Sheets-Sheet 4

INVENTOR.
Jacob M. Kuhlik

Patented Sept. 18, 1951 2,568,681

UNITED STATES PATENT OFFICE 2,568,681

SOUND RECORDING AND REPRODUCING MACHINE

Jacob M. Kuhlik, Brooklyn, N. Y., assignor to Hattie B. Kuhlik, Sea Gate, N. Y.

Application December 8, 1943, Serial No. 513,401

3 Claims. (Cl. 274—11)

This invention relates to a machine for recording sound vibrations upon a strip of film in the form of an endless band for reproduction purposes and also for reproducing sound from said film.

An object of my invention is to provide a machine of this type with means for supporting an endless film band of considerable length or a band of short length as desired.

A further object is to provide means for tensioning such bands for recording thereon.

Another object is to provide means for automatically moving the sound unit or head from one track to another transversely of the film band.

Another object is to provide means for adjusting the tension of the sound head stylus upon the film band when recording and reproducing.

Another object is to provide a machine of this type with two spaced sound units or heads with means for selectively moving either one of said heads into operative position over the film band.

Another object is to provide improved means for driving the film band in recording and rewinding directions.

Another object is to provide means for indicating the position of the stylus longitudinally of the film band.

Another object is to provide means for indicating the position of the stylus transversely of the film band.

Another object is to provide means for controlling the speed of the drive for the film band.

Another object is to provide means for identifying or selecting particular tracks upon the film.

Another object is to provide means for identifying or selecting particular zones or sections along the film band.

Another object is to provide means for removing the stylus off of the film for rewinding said film.

Another object is to provide a machine of this type that is simple and compact in construction and noiseless and positive in action.

Other objects and advantages of my invention will be apparent from the description thereof to follow taken in connection with the accompanying drawings in which—

Figures 4, 5, 6, 7, 8, 9, 10:
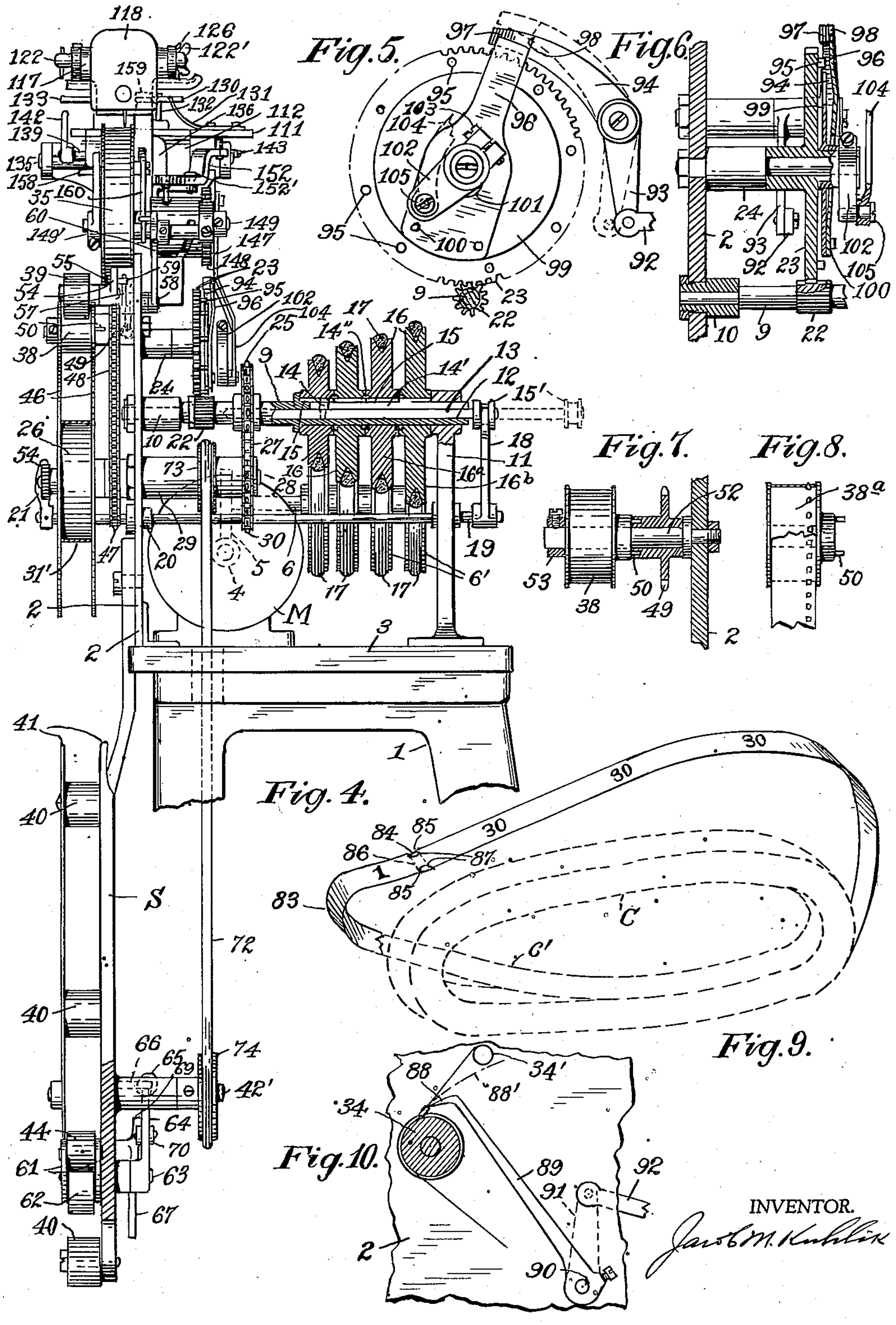
Fig. 4 is an end view thereof looking from the left of Fig. 1, with parts being broken away and parts being shown in section for the sake of clearness.
Fig. 5 is a detail view of the clutch mechanism.

Fig. 6 taken on the plane of the line through the spring arm is a sectional view of the clutch mechanism of Fig. 5.

Fig. 7 is a detail view of a film feeding wheel and associated parts for feeding non-perforated film used with my machine, parts being shown in section.

Fig. 8 is a detail view of another form of film feeding wheel for feeding perforated films used with my machine.

Fig. 9 is a perspective view of an endless film band used with my machine.

Fig. 10 is a fragmentary detail view on an enlarged scale showing the mechanism for tripping the clutch mechanism, parts being shown in section.

Figure 1:
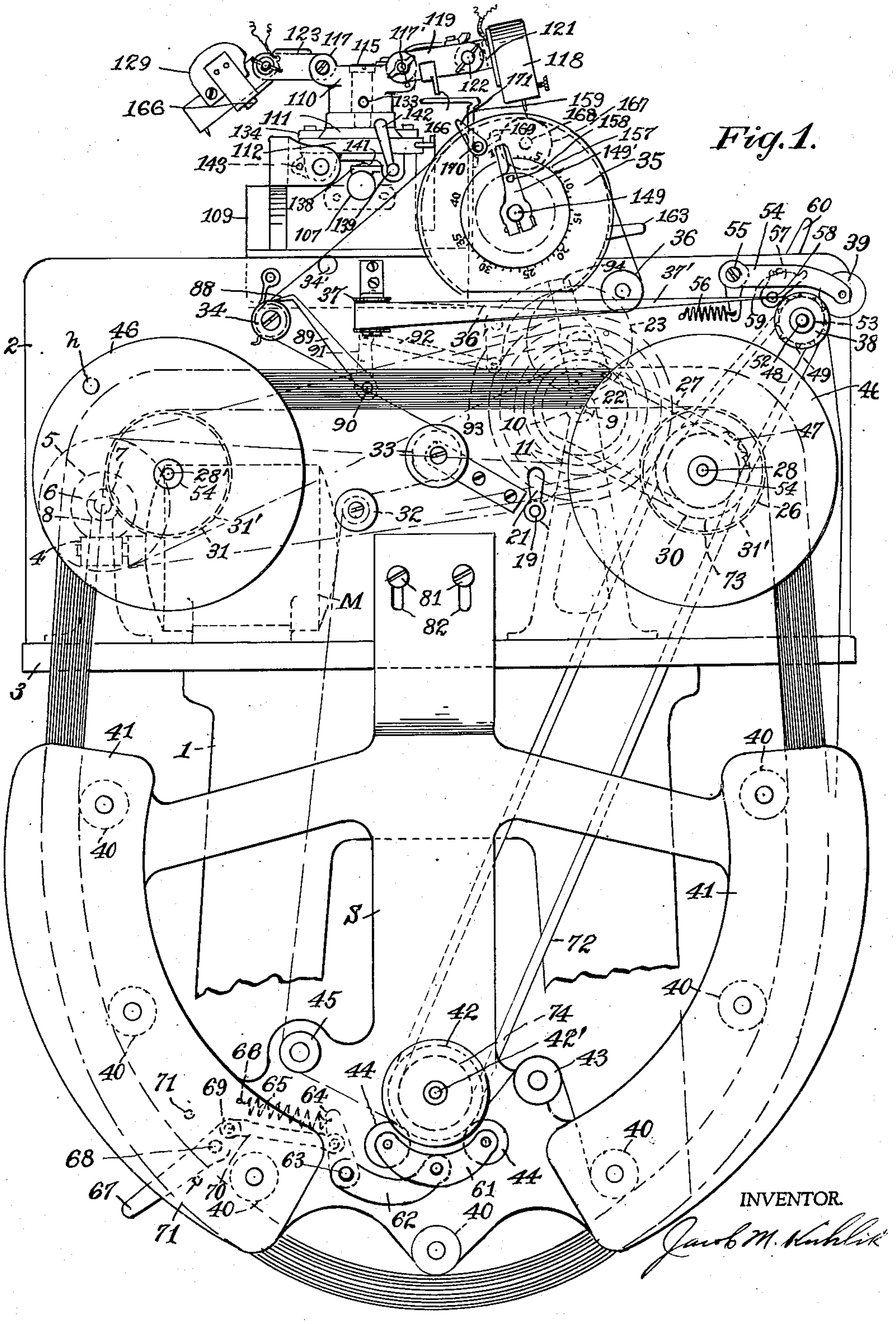
Fig. 1 is a front elevation of a machine embodying one form of my invention.
Figures 11, 12, 13, 14, 15, 16, 17, 18, 19, 20, 21, 22, 23:
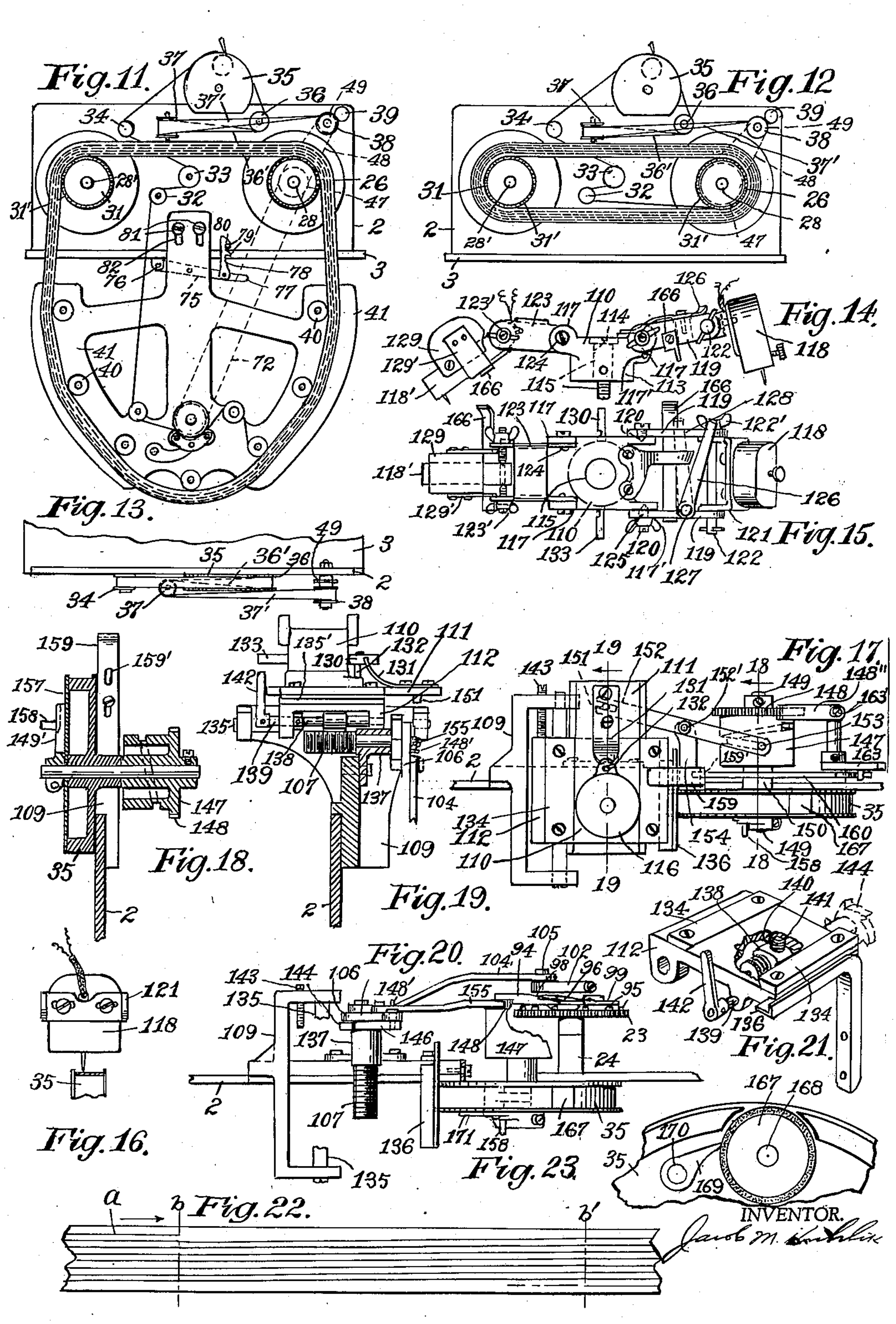

Fig. 11 is a view similar to Fig. 1 but on a reduced scale, with the sound units and associated parts removed and showing means for moving the film support and holding same in adjusted position.

Fig. 12 is a front view of the upper part of the improved machine with the sound units and associated parts removed showing a modified manner of supporting a film band of comparatively small length.

Fig. 13 is a fragmentary detail view showing means for directing the film band along offset paths during its travel.

Fig. 14 is a front view of the sound head units and their supporting device.

Fig. 15 is a top plan view thereof.

Fig. 16 is a detail view of a sound head or unit in position on a film band.

Fig. 17 is a top plan detail view of the mechanism for moving the stylus transversely of the film.

Fig. 18 is a sectional view taken on the plane of the line 18—18 of Fig. 17 with parts removed.

Fig. 19 is a part elevational and part sectional view of the mechanism of Fig. 17 taken on the plane of the line 19—19 of Fig. 17.

Fig. 20 is a view similar to Fig. 17 with some of the parts removed.

Fig. 21 is a perspective detail view of the main sliding carriage, with parts being broken away.

Fig. 22 is a fragmentary detail view of a strip of film showing the grooves thereon.

Fig. 23 is a fragmentary detail view on an enlarged scale showing the base over which the film moves when engaged by the stylus.

My improved machine may be of the stationary or portable type but is illustrated in Fig. 1 as of the former type. It is preferably mounted on a standard or support 1. The various units of the machine are supported by a base member 3 mounted on the standard and by a front panel or wall 2 fixed to the base.

A motor M is secured to the base and is connected to a source of electromotive power (not shown) for driving the machine parts. A worm 4 on the motor shaft drives a worm wheel 5 fixed on a shaft 6 at a reduced speed. Shaft 6 is disposed transversely of said motor shaft to position the wheel 5 in engagement with the worm and is journalled in a bearing member 7 on the front panel 2 and in a bearing portion of a bracket 8 on the base, at its rear. Fixed on the shaft are a plurality of spaced grooved pulleys 6′.

Figures 2, 3:
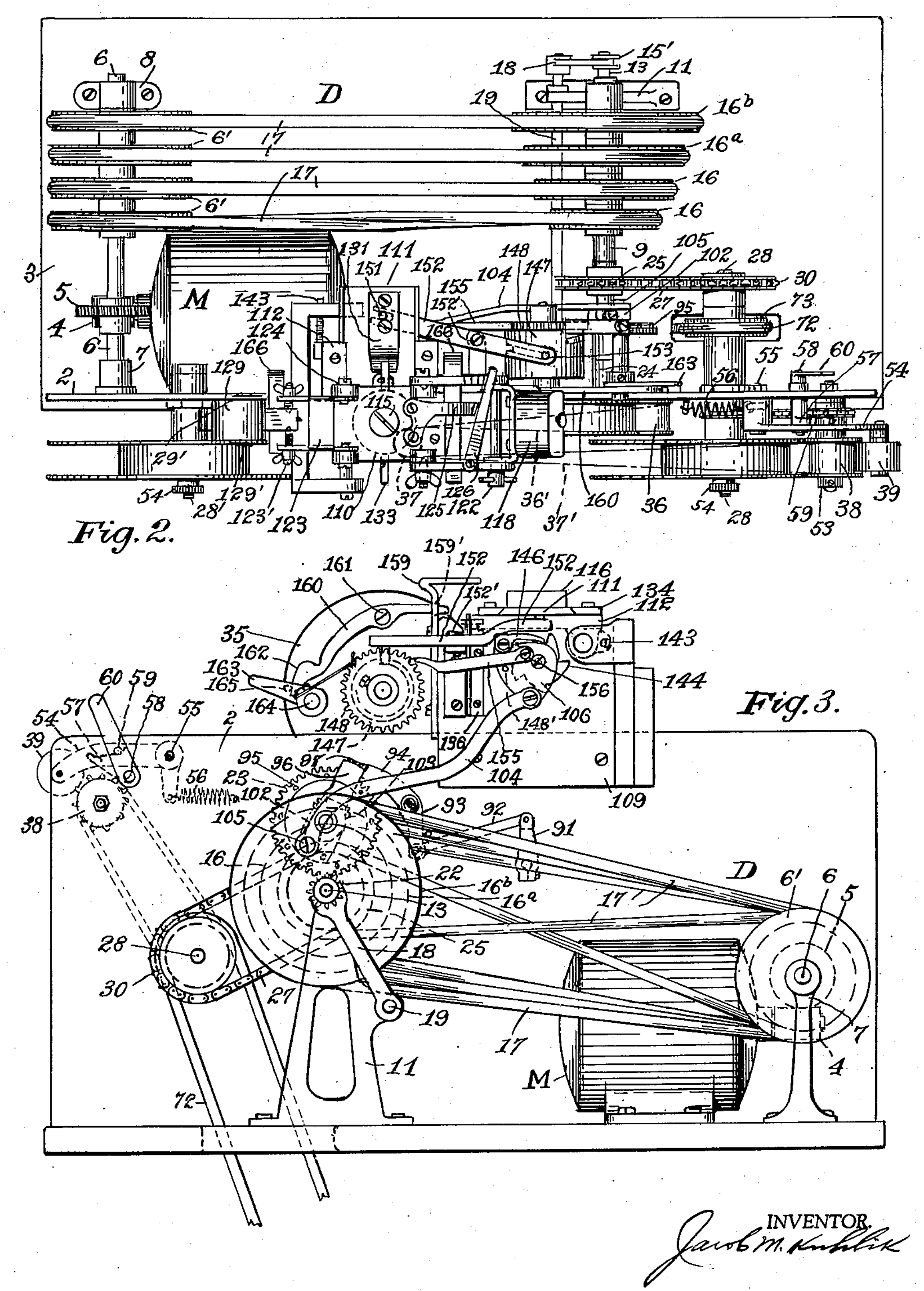
Fig. 2 is a top plan view thereof.
Fig. 3 is a rear view of the top portion of the machine of Fig. 1 with the sound head units and their mounting removed.

A shaft 9 is journalled in a bearing sleeve 10 on the front panel 2 and in a bracket 11 fixed on the base at its rear. The shaft 9 is spaced away from shaft 6 and slightly above the same as seen in Fig. 3. Shaft 9 is formed with an axial bore or opening to receive a sliding shaft 13. A short key member 14 is carried by shaft 13 and extends through and slightly above elongated slot 14′ in shaft 9. A number of spaced grooved pulleys of varying diameters are loosely mounted on shaft 9. These pulleys are aligned with the pulleys on shaft 6 and are of varying diameters to provide different speeds for the shaft 9. Four sets of pulleys are shown but any desired number may be used depending upon the speed desired. The pulley with the smallest diameter on shaft 9 is indicated at 16, and the next larger pulleys are indicated at 16′, 16*a* and 16*b*, respectively. The drive is brought from the pulleys on shaft 6 to the pulleys on shaft 9 by belts 17 but if desired sprocket wheels and chains may be used.

The means for coupling the desired set of pulleys comprises a shaft 19 slidably supported by a bearing sleeve 20 on the front panel and by a bracket 11. A forked lever 18 is fixed to the rear end of the shaft 19 and has its forked end in engagement with a grooved collar 15′ on shaft 13. A handle 21 in the front end of the shaft 19 in front of the panel is adapted to slide said shaft inwardly and outwardly and through the lever bring said movement to shaft 13 to carry the key 14 thereon to the keyway of the desired pulley on shaft 9 for driving said shaft at the desired speed.

To permit the pulleys on shaft 9 to run idly, the key 14 may be moved into one of a number of annular grooves 14″ formed in the hub portions of adjacent pulleys on said shaft. This also permits the key to be shifted from one keyway to the next without locking. When the pulley with the smallest diameter on shaft 9 is keyed to shaft 13 as shown in Fig. 4, the shaft 9 is connected for reverse movement of the film.

When the shaft 13 is shifted outwardly of the position of Fig. 4, it brings the key 14 into the keyway of the next larger 16′ when the parts are in position to drive the shaft for forward movement of the film at a speed generally used for standard sound recording, for instance, at a rate of thirty feet per minute. The next larger pulley 16*a* is adapted to drive the shaft for forward movement at a slower speed, and the largest pulley 16*b* at a still slower speed as will be understood.

One form of my invention is embodied in a machine adapted to make a continuous run for a considerable length of time, for instance, twenty-four hours, and using an endless film band of considerable length, for instance, one thousand feet. The machine of Fig. 1 is adapted to use the long film band, such as the film indicated at F. In this machine, the film band is directly supported by spaced reels or drums 26 and 31 adjacent the ends of the panel and in the same vertical plane. Reel 26 is mounted in front of the panel 2 on the outer end of a shaft 28 rotatably supported by a bearing sleeve 29 on the panel. Fixed on the inner protruding end of shaft 28 is a sprocket wheel 30. A sprocket wheel 25 fixed on shaft 9 and a chain 27 bring the drive from said shaft to sprocket wheel 30 and shaft 28. Reel or drum 31 is rotatably supported on a stub shaft 28′ mounted in a bearing 29′ on the front of panel 2. Thumb nuts 54 hold the drums or reels 26 and 31 removably on their respective shafts.

The film band hangs suspended from said drums 26 and 31 below the base plate 3 in looped formation and is held in such looped formation and guided in its movement by a substantially cross-shaped frame S detachably and adjustably mounted on the panel 2.

Mounted on a stub shaft in the panel 2 at one side of its center and between the reels or drums 26 and 31 is an idler roller 32 and mounted on a stub shaft centrally of the panel and above roller 32 is another roller 33. Another roller 34 is mounted adjacent the top of the panel and to one side of the center thereof. A substantially circular anvil or base 35 is mounted to one side of the center and adjacent the top edge of the panel so that the circular top edge or periphery thereof protrudes above the edge of the panel and above the roller 34. An idler roller 36 is mounted on the panel to the side of the anvil opposite the roller 34. Rollers 32, 33, 34, anvil 35 and roller 36 are so positioned that their peripheries are on the same vertical plane, which plane is disposed rearwardly of the vertical plane of the reels 26 and 31.

A roller 37 is mounted on a bracket on the panel on the side of the anvil 35 opposite to the roller 36, and this roller is disposed with its axis transversely disposed relative to the axis of roller 36. On the panel at the side of the anvil 35 opposite to that of roller 37 is a roller 38, the periphery of which latter roller is positioned in the same vertical plane as the plane of the reels or drums 26 and 31.

Frame S supports a number of spaced idler rollers 40 in an arcuate path in the same vertical plane as the reels 26 and 31. Spaced curved plates 41 supported between the cross arms and the lower vertical arm of the frame and on both sides of the side rollers 40 serve to guide the film band in its movement and also to keep the convolution in an orderly fashion.

A roller 42 is rotatably mounted on a stub shaft 42′ adjacent the lower end of the lower vertical arm of the frame and centrally thereof. On one side of said roller 42 and slightly above the same is an idler roller 43 and on the opposite side of said roller 42 and slightly above the same is another roller 45.

All of the rollers supported by the frame S are disposed in the same vertical plane as the plane of the reels or drums 26 and 31.

The path of movement of the coil or film band F, which is positioned around the reels 26 and 31 between circular flange plates on said reels and around the rollers 40 between the plates 41, is as follows: the inner convolution or layer of this band leaves the band or coil after it passes the roller 40, adjacent the lowermost roller, and to the right thereof as seen in Fig. 1, and then is directed upwardly over the idler roller 43 from which it passes along the lower periphery of drive roller 42 and then upwardly around roller 45. From roller 45 it moves directly vertically upwardly to and over roller 32 and then laterally around roller 33 and then laterally and upwardly around and over roller 34 from which it passes laterally and upwardly over the upper peripheral surface of supporting anvil or base 35 and then downwardly and around roller 36. From roller 36 it passes horizontally and laterally to roller 37 during which passage it is given a one-quarter turn or twist as indicated at 36'. After leaving roller 37 it is given another one-quarter turn as indicated at 37'. After the convolution or layer leaves roller 38 it is directed downwardly between the plates 41 to the outer periphery of the band where it becomes the outer convolution or layer thereof.

The means for driving or feeding the film is as follows: the film is supported on the reels or drums 26 and 31, each of which drums has a rubber-faced peripheral surface as indicated at 31' for frictionally advancing the film band on its inner layer or convolution. Reel or drum 26 is positively driven by driven shaft 9 by means of the shaft 28 mounting said reel, and loosely advances the film band with its plurality of layers around the spaced rollers 40 and around the idler reel or drum 31 whose rubber-faced periphery serves to advance the film band. The film band or coil is guided in its movement by the flange plates 46 on the reels 26 and 31 and by the curved plates 41 carried by the frame S. The inner layer of the film band after it leaves the rollers 40 is positively driven by the roller 42. The drive is brought from shaft 28 to said roller 42 by a belt 72 coupling a grooved pulley 73 on shaft 28 with a grooved pulley 74 on the inner end of shaft 42'. Spring pressed rollers 44 are positioned to press the film layer against roller 42 as it passes. The layer is also advanced along its path of travel by the roller 38 which is operatively connected to the shaft 28. This connection comprises a sprocket wheel 47 fixed on shaft 28 adjacent drum 26 at the front of the panel. Movement of this wheel is brought by a chain 48 to another smaller sprocket wheel 49 supported on panel 2. Feed roller 38 is detachably connected to sprocket wheel 49 by means of pins 50 on the hub portion thereof engaging in slots or socket portions 51 in the hub portion of said wheel (see Fig. 7). Sprocket wheel 49 is mounted loosely on a stub shaft 52 in the panel 2 and this wheel and feed roller 38 are held on shaft 52 by means of a set screw passing through a collar 53 on the outer end of shaft 52. A roller 39 presses against the film layer as it passes over the feed roller 38 to aid in frictionally advancing the layer. After leaving the roller 38, the layer will loosely wind itself on the film band and becomes the outer layer thereof.

The feed rollers 26, 38 and 42 are positively driven and all have a uniform surface speed imparted thereto which may be regulated by the driving mechanism aforesaid. This surface speed is maintained on the inner layer of the coil of film band as the coil is revolving around the rollers 40.

The feed roller 38 may have a plain peripheral surface as shown in Figs. 1 and 7 for frictionally driving a plain or non-perforated film, or it may have sprocket teeth on its peripheral surface adjacent one edge thereof for driving engagement with a perforated film 38*a* as shown in Fig. 8.

The inner layer strand of the coil is constantly being withdrawn from the coil and carried over the anvil or base 35 to be acted upon by the sound unit to be later described and is tightly drawn over rollers 36 and 37 by the feed roller 38 from which point the inner layer or strand returns to become the outer layer of the coil. The speed of the inner layer of the coil as it leaves the coil from the inner part thereof and as it returns to the outer part of the coil and aided by the rubber facings 31' of the reels 26 and 31 a loose condition of the coil takes place, the inner strands of the coil being constantly shifting upon themselves. On account of this arrangement, it is also possible to reverse the drive of the film for a considerable length in order to repeat a portion of the film recorded upon to reproduce or to play-back the same.

For applying and releasing the control pressure upon the feed rollers 38 and 42 any suitable means may be employed. For the roller 38, I have shown in Fig. 1 a bell crank 54 pivoted to a stud 55 fixed on the front of the panel 2 at one side of the roller and having its long arm extending over said roller to the other side thereof where it supports the roller 39 on its free end. This arm and roller are held in pressing engagement with the roller 38 by means of a spring 56 which has one end fixed to the panel and its other end fixed to the short arm of the bell crank. The pressure may conveniently be released or adjusted for lacing the film between the rollers 38 and 39 by a cam member 57, fixed on one end of a shaft 58 supported in the panel, and which is adapted to be moved in sliding engagement with a pin 59 on arm 54 by a handle 60 on the inner end of shaft 58 for adjusting the tension of the roller 39 on the film. The working face of the cam is provided with grooves or depressions for receiving the pin and holding the parts in adjusted position.

For applying and releasing the pressure of the rollers 44 upon feed roller 42, I have shown the rollers 44 supported at the ends of a curved lever 61 and disposed so that they engage the lower periphery of roller 42 on both sides of its center in order to provide greater contacting surface which is necessary for moving the film band in forward and reverse directions. Lever 61 is pivotally connected at its center with one end of another curved lever 62, the other end of which latter lever is connected to a rotatable stub shaft 63 in the lower end of frame S at the other end thereof. An arm 64 is connected to the inner end of said stub shaft 63. The means for rocking said shaft 63 with its associated parts comprises a link member 70 which has one end connected to the arm 64 at its center, and has its other end pivotally connected to the inner end 69 of an actuating handle 67. Handle 67 is pivoted to the frame as indicated at 68. Movement of the handle 67 will, through the aforesaid connections, rock the lever 61 with its rollers 44 to and away from the feed roller 42. A helical spring 65 with one end fixed to the frame as indicated at 66 and its other end fixed to the upper end of arm 64 urges the rollers 44 into contacting engagement with roller 42. Lifting of the handle 67 will push the arm 64 to move the rollers away from the feed roller 42 and on moving the handle to an extreme movement the link 70 will, upon passing a dead center point, assume a locked position. Pins 71 extending from the frame in the path of movement of the handle act as stops to limit such movement.

It will be obvious from the foregoing that the speed of the drive for moving the film forwardly may be controlled or regulated and the drive reversed for moving the film backwardly while the motor is running by merely coupling the desired set of pulleys on the shafts 6 and 9, which may be done by moving the handle 21. If desired, a switch (not shown) may be mounted at a convenient place on the panel and operatively connected to the motor for starting and stopping the same.

It will be noted, as is well known in the art, that it is very difficult to reverse the drive of an endless film band as is required in the present type of machine for playback or to repeat a subject already recorded. In accordance with my invention, however, a considerable length of such endless band may be so returned. For this purpose, I have shown in Fig. 11, a lever 75 pivotally mounted at one end on a pin 76 fixed on a bracket on the bottom of base 3 adjacent the upper end of the vertical arm of the frame S. Carried by said lever adjacent its outer or handle portion 77 is an upstanding arm 78 having laterally projecting hooks 79. This lever is connected to the frame S by a pin 75' whereby movement of said lever is imparted to the frame for moving the frame up and down. The frame is connected to the panel 2 by means of screws 81 passing through elongated slots 82 formed in the upper end of the vertical arm of the frame whereby the frame may be moved up and down for adjustment. A pin 80 mounted in the base 3 in the path of movement of the arm 78 is adapted to be engaged by one of the hooks 79 to hold the frame S in adjusted position. By reason of this construction, the frame S with its rollers 40 is adapted to be moved upwardly away from the film coil or band, leaving the coil or band to be supported only by the reels or drums 26 and 31 whereby said coil becomes very loose at its lower part thus permitting reverse or backward movement of the film for a considerable length.

The return drive of the film band or coil and other features in connection therewith will be better understood after describing the manner in which the band is divided into zones or sections which are visible to the operator while the band is moving through the machine.

An endless band or coil of film for use with my improved machine is shown in Fig. 9. The coiled portion of the film is shown in broken lines and indicated at C. The inner strand C' of the coil is shown as leaving the strand and as being looped and turned back over the coil to become the outer layer or part of the coil, the looped or turnedback portion of the strand being shown in full lines. It will be understood that the ends of the film had previously been connected together to form an endless band.

This endless band or coil is marked at suitable spaced intervals therealong to indicate zones or sections therealong. Any suitable marking may be employed but such zones are preferably indicated by consecutive numbers printed or otherwise shown on the band to indicate each foot of its length. For example, in Fig. 9 I have shown the figure "30," to the right of joint where the band ends are connected, which represents footage and indicates that the band or coil has thirty sections of one foot each and is therefore 30 feet long. The figure "1" appears to the left of the joint and represents the first zone or foot of the band as will be understood. The film with the markings thereon are visible at the top of the supporting anvil 35. This indicating of the zones or sections along the film permits the operator to note the particular zone in which a certain subject is being recorded so that such particular zone can be identified and returned to for whatever purpose desired such as for reproducing or play-back. This return of the particular zone desired to operative working position may be accomplished by simply running the film forward on a line track previously made or by reversing the film drive. If the film used is very long, for instance 1000 feet, it would be quicker to run the film forward to the desired zone rather than reverse the drive. It may be here noted that the cross belt 17 for the reverse drive may be omitted and instead thereof a high speed forward drive may be used to return the film to any particular zone on any line track desired.

The endless bands for use in this type of machine may be wound with different size loops in any suitable manner for instance on a form, preparatory to use on the machine. The preformed endless band may then be mounted around and in position on the reels 26 and 31, said reels being removable for this purpose, and the reels with the band thereon placed in position on the shafts 28 and 28' with the coils of the band around the necessary rollers and with the loose inner strand extended ready to lace over the rollers.

The sound unit 118 or 118' for cutting grooves on the film band and for reproducing the recorded matter impressed thereupon respectively is adapted to be moved transversely of the film band for recording and reproducing upon a plurality of tracks. Mechanism for automatically shifting said sound unit from one track to another will now be described.

Referring to Fig. 9, at any suitable point along the film band, such as at a loop end 83 the edges of the band may be notched as indicated at 85 to receive a light metal strip or clip 84, which band is positioned across the under surface of said film band with its ends 87 turned back over the top surface of the film band for securing the metal strip to the film. The notches prevent the metal strip from extending laterally of the film edges. The edges 87 of the metal strip are only sufficiently long to secure the strip to the band and leave sufficient area of the top of the film for cutting grooves thereon and do not interfere with the operation of the sound unit. On the under surface of the film band, the metal strip 84 extends or bulges slightly outwardly from said surface.

On a shaft 90 pivotally supported by panel 2 is an arm member 89 formed with a hooked portion 88 at its outer free end. Arm 89 extends toward and over roller 34 so that its hooked portion 88 is adapted to engage the periphery of said roller and is adapted to engage the lower surface of the film band during its forward travel. Fixed to said shaft 90 is an upstanding arm 91 and pivotally connected to one end of said arm is a link 92, the other end of said link being connected to one arm 93 of a bell crank pivoted on the panel, the other arm 94 of said bell crank forming part of a clutch mechanism herein termed a "one-revolution clutch." This clutch mechanism includes a pinion 22 fixed on driven shaft 9, which pinion is in continuous mesh with a gear 23 loosely mounted on a stud 24 on the panel near the shaft 9. Gear 23 carries pins 95 at spaced intervals around one surface thereof, which pins extend into the path of movement of a rotatable spring arm 96. The outer end of arm 96 is adapted to engage the arm 94 of the bell crank during its rotation. The outer free end of arm 94 is formed with a cam-shaped portion 97, which portion terminates in a shoulder stop 98, at which point the spring arm is free of the pins 95 on the rotating gear. The spring arm 96 is secured at one end to a disc 99 as indicated at 100. The center of the spring arm 96 is formed with an opening 101 to provide free movement around the hub of the disc 99, which disc is freely mounted on the hub of the gear 23 (see Fig. 6) and is adapted to be at rest when the spring arm engages the stop 98.

When the film in traveling in a forward direction for recording or reproducing, passes over roller 34 it carries the metal clip 84 around with it and inasmuch as the hook 88 of arm 89 is in the path of movement of this clip, the clip engages the hook and lifts the arm 89 upwardly thereby rocking the shaft 90 and the arm 91 and lever 92 to trip the bell crank which carries the cam 97.

Upon rocking the bell crank by means of the lever 92, the arm 94 with its cam 97 is moved away from the spring arm 96 as shown in broken lines in Fig. 5 whereupon the spring arm 94 is sprung toward gear 23 into the path of movement of the pins 95 and is engaged by one of said pins and carried around with the gear. The gear and disc with the spring arm 96 will make one full revolution before the outer free end of arm 96 is again brought into contact with the cam 97 when said arm 96 will be sprung away from the pins 95 to a stationary position.

The arm 89 upon being lifted by the clip on the film moves its hooked portion along an arcuate path such as indicated at 88' in Fig. 10 while the film band moves angularly and upwardly over the roller 34' whereby the hook 88 is released from the metal clip and the arm 89 returns to normal position restoring the cam 97 to camming position before the clutch makes a complete revolution.

On the hub portion of disc 99 lever 102 is clampingly mounted by a screw 103. A lever member 104 is connected to this lever 102 by means of a pin 105. An elongated lever 104 has one end pivotally connected to said lever 102 by means of a pin 105, and its other end is pivotally connected to a plate member 106 mounted on the end of a feed screw 107 supported in a bearing in a frame 109 fixed on the top of the panel. The frame 109 and supporting anvil 35 are joined together to form a unitary structure, which structure supports the sound units and associated parts for adjusting the position thereof on the film. The sound units are mounted for step by step movement across the film band and such mounting includes a rotatable turret head 110 carried by an auxiliary carriage 111 slidably supported by a main carriage 112 which slides upon the structure 109. The turret is formed with a cylindrical body portion 113 having a central opening 114 for loosely receiving a shouldered screw 115, the lower end of which screw is adapted to be threaded into a cylindrical or hub portion 116 of the carriage 111. The cylindrical body portion 113 is formed at its top end with spaced ear portions 117 which are adapted to pivotally and adjustably support sound units 118 and 118', each of which units may include electromagnetic mechanism for recording matter on the film and for reproducing such recorded matter, or one of said units may be solely for recording and the other for reproducing. I have illustrated the sound unit 118 as a recording unit and the unit 118' as a reproducing unit.

On one side of the body portion 113, the right hand side as seen in Fig. 14, a link or plate member 119 is pivotally connected to each ear portion 117 by means of a pivot pin 120. The downward swing of said bars 119 are limited by a stop pin 117' mounted on the bottom of one of the ear portions. The outer ends of the links 119 embrace a U-shaped bar or frame 121. The overlapping portions of the links 119 and bar 121 are formed with aligned openings to receive a rod 122. This rod passes freely through the aligned bores at one side of the bar 121 and at the other side the aligned bores are reduced in size to receive the reduced portion formed on the end of rod 122, which reduced portion is screw threaded at its outermost end. A thumb nut 122' screwed on the reduced portion of the rod clamps the bar 121 and links 119 against relative movement. The cross piece of bar 121 is slotted for adjustably supporting the sound unit 118 thereon by means of screws passing through said slots (see Fig. 16).

On the other side of the cylindrical body 113, a pair of spaced link members 123 similar to the links 119 are similarly connected to the ears 117 on said side. The links 123 however are connected by an integral bridge or cross piece at their top edges, and are connected to the ears 117 by screws 124 passing through aligned bores in the links and ears. The outer ends of the links 123 are pivotally connected to the sound unit 118' by screws 123' having pin points engaging in a transverse opening in the sound unit. Wing nuts on the screws may be used to clamp the links to the unit. The screws permit lateral adjustment of the sound unit.

By reason of this construction, the turret head 110 may be swung around to bring either the sound unit 118 or the unit 118' in operative position over the supporting anvil 35 for acting upon the film, and because of the hinged and flexible connections between the units and the ears, said units may be adjusted to any angular position.

The pressure on the recording unit 118 must be regulated so that the unit may be quickly lifted when desired to attach a new stylus needle or for other purposes. I accordingly provide a spring bar 125, one end of which is fastened to the turret head 110 and its other free end extends laterally between the links 119 and slightly above the upper edges thereof. A bar 126 is pivotally secured as indicated at 127 to the upper edge of one of the links 119 and extends across the space between the links and is adapted to be swung under the spring bar 125 to provide the necessary pressure to force the sound unit 118 with its stylus downwardly upon the film band for recording. The upper edge of the opposite link 119 is formed with spaced depressions 128 to receive the bar 126 and to provide varying degrees of pressure. Bar 126 may be formed at its outer free end with an upwardly extending finger portion to facilitate movement thereof.

The sound unit 118' is rectangular in cross section and is straddled on the top by a weighted member 129 secured to its sides. A strap 129' encircles the weight and sound unit and has a portion extending under and rearwardly of the unit and adapted to engage the links 123 to stop the downwardly swing of the unit.

When the turret head 110 is swung so as to bring the sound unit 118 into operative position over supporting anvil 35 as shown in Fig. 1, a pin 130 on said head and extending from one side thereof rides over a detent spring 131 (see Figs. 2, 17 and 19) and is adapted to engage a notch in the end of said spring to hold the turret head in adjusted position, with the sound unit 118 in operative position. Rotation of the turret head in one direction is stopped by an upstanding pin 132 on the carriage 111. The turret head carries another pin 133 opposite pin 130 for engaging with the detent spring when the turret head is swung to bring the sound unit 118' into operative position over the anvil.

The auxiliary carriage 111 is guided for sliding movement on the main carriage 112 by means of guide plates 134 secured to the top surface of said main slide. The main carriage 112 moves along a rod 135 mounted transversely of the frame 109, the rod passing through an opening formed in one side of the carriage, and the carriage is guided in its movement at the opposite side by the walls of a groove 135' formed in a rail member 136 on the frame 109 (see Figs. 19, 20 and 21). The main carriage is adapted to be moved step by step transversely of the anvil 35 and the means for actuating the carriage includes the feed screw 107 supported in a bearing 137 fixed on the frame 109. A rod 138 is positioned parallel to and adjacent the screw and is formed at one end with a semi-circular portion having screw threads on its lower surface, which semi-circular portion is adapted to be swung into and out of engagement with the threads on the screw 107. The other end of the rod 138 is connected to a rock shaft 139 carried by the main carriage, which shaft may be actuated by a handle 142 fixed on its outer end for moving the rod 138 into and out of operative position on the feed screw. A helical spring 140 having one end seated in an opening or socket 141 formed in the floor portion of the main carriage and having its other end impinging against the upper surface of the semi-circular portion of rod 138 presses said portion into engagement with the feed screw. Movement of the main carriage may be regulated by a set screw 143 mounted on the frame 109 in the path of movement of said carriage.

The main and auxiliary carriages are adapted to move in unison but are also adapted to be separately controlled in their step by step motion across the film. The main carriage is moved by feed screw 107 as described hereinbefore and the mechanism for rotating said screw includes a ratchet wheel 144, herein shown as having five teeth, fixed to the outer end of said feed screw. Plate 106 loosely mounted on said screw adjacent the ratchet wheel carries a pivoted pawl 146 disposed in the path of movement of the teeth of the ratchet wheel so that upon each complete rotation of the crank arm 102, of the clutch mechanism, during which the clutch device is tripped, the plate 106 is rocked to draw the pawl away from contact with one tooth of the ratchet wheel and then moved into contact with the next adjacent tooth to thereby move said ratchet the distance of one tooth and accordingly rotate the feed screw one-fifth of a complete rotation. Rotation of the feed screw moves the main carriage with the auxiliary carriage and supported sound units to a new line position transversely of the film. This movement of the main carriage occurs each time the metal clip 84 on the film band trips the arm 89 and associated parts for tripping the one-revolution clutch. A plurality of sound grooves or tracks are thus cut or impressed on the film as shown in Fig. 22. Referring to Fig. 22, a sound groove or track indicated at *a* is started at the point indicated at *b* and continues along the length of the film band in a line parallel with the edges of the film band and running in the direction indicated by the arrow until the one-revolution clutch is tripped, which is at the point indicated *b'*, for example. This tripping moves the main and auxiliary carriages with the sound unit which is acting upon the film rather slowly, since the clutch moves slowly, so that the stylus is moved from the point *b'* to a new line position on line *b*. In this manner grooves or tracks are cut in spaced relationship for the full width of the working surface of the film band as shown for each circuit of the band.

It will be noted that no matter how long the film band may be, the clip 84 operates the clutch and thereby a continuous track is formed on the band from the starting point, as at *a*, for example, at one side of the band, thus forming a plurality of tracks the width of the band in one continuous unbroken line along the band to the other side of the band.

As stated above the sliding movement of the auxiliary carriage 111 may be separately controlled and it is desirable that means be provided for indicating the track line being traversed by the stylus of the recording unit carried by said auxiliary carriage to permit the operator to return to said particular track after traversing another track or tracks. Such controlling and indicating means will now be described.

The carriage control mechanism includes a grooved cam wheel 147 having a flange at one edge thereof formed with peripheral teeth 148. The wheel is fixed on a shaft 149 supported in a bearing 150 in the center of the supporting anvil 35 over which the film dries. The carriage has a pin 151 depending from its underside and this pin is engaged by the forked end of a lever 152 supported at its center as indicated at 152' on a bracket 154 mounted on the anvil. The other end of the lever 152 carries a pin 153 which engages in the groove on the surface of the cam wheel 147. The groove in the cam wheel is proportioned to move and lead the auxiliary carriage in the same ratio as the main carriage is moved. This is accomplihed by a pawl 155 pivotally connected at one end with the rocker plate 106 as indicated at 156, and having its other free end disposed to engage the teeth 148 on the cam wheel 147. The rocker plate 106 is rocked by the link 104 on each revolution of the clutch device, and each time this plate is rocked the pawl will move the cam wheel one tooth space. The cam wheel is held in this position by a spring detent 148'' fixed on the end of the stud 163'. The position of the pivotal connection 156 of the pawl 155 on said plate, close to the center on which it swings, is such that the free end of the pawl 155 will be disengaged from said teeth 148 when the plate is in the idle position. The pawl is held in disengaged and elevated position by a pin 148' on the rocker plate 106.

On the front of the supporting anvil 35 a dial 157 is positioned to coact with a pointer 149' fixed on the outer end of shaft 149 and adapted to move around the figures on said dial (see Fig. 1). The figures on the dial represent the number of tracks impressed on the film band from side to side thereof and by reason of the connection between the shaft 149 and the main and auxiliary carriages, the particular track upon which the stylus of the sound unit is operating is indicated by the pointer 149', and this particular track may be noted by the operator in any suitable manner. For example, if the main carriage is on line "25," the auxiliary carriage will also be on the same line because of the connections between said main and auxiliary carriages. The number "25" is noted by the operator. Should it be desired to stop operating upon track "25" and return to track number "4," for example, to reproduce or play-back some matter on said line, the pointer 149′ may be grasped by the finger, an outwardly extending finger piece 158 being provided on the pointer for this purpose, and the pointer turned back to number "4" on the dial. The auxiliary carriage and associated parts including the turret head are also moved to track number "4" position on the film. The desired sound unit on the turret head may be brought into operative position on said track "4" by merely swinging the turret head around to bring the desired sound unit over the anvil 35. The film band at this time is running forward and assuming the subject matter desired to be reproduced has already run past the sound unit, the sound unit is lifted and the drive reversed to move the film backwardly until the proper position along the film is reached. The drive is again changed to forward and the sound unit positioned on the film for reproducing the desired subject matter. The operator having noted the track upon which operations were interrupted, in this instance, track "25," it is merely necessary to turn the pointer 149′ around again to said track when the parts will be in position for further operations thereon. During this adjustment of the parts, the clutch is inoperative, the pawl 155 having been withdrawn from the gear teeth, the pointer 149′ may be rotated to move the auxiliary carriage to any desired track position without interference by the pawl.

For raising the sound units from operative position upon the film to inoperative position thereabove, a lifting device 159 having a vertical portion slidably mounted by a slot and stud connection with the frame 109 and having a horizontal portion movable into a portion of the sound unit mounting may be provided (see Figs. 3 and 18). This lifting unit or device is actuated by an elongated lever member 160 which is pivoted as indicated at 161 to the rear of the anvil 35. One end of this lever is adapted to enter a slot 159′ formed in the vertical portion of the lifting device 159, and the other end of the lever is formed with a cam-shaped portion 162. A handle 163 is pivotally mounted on a stub shaft 164 supported on the anvil 35 adjacent the cam portion of the lever. This handle carries a pin 165 adapted to ride on the surface of said cam portion forcing the lower end of the lever downwardly and the upper end upwardly to lift the lifting device 159 upwardly. The device 169 is held in lifted position by the pin 165 engaging in a recess in the lever at the top of the cam portion. Extending across the lower edges of links 119 and extending across the sound unit 118′ under the strap 129′ are cross pieces or bars 166. When the turret head 110 is in position on the auxiliary carriage 111 the cross piece is positioned above and in line with the horizontal portion of the lifting device so that upon lifting of said lifting device the horizontal portion engages said cross piece to lift the sound unit off of the film. The ends of the cross pieces are curved to permit them to ride up over the horizontal portion of the lifting device 159 thereby permitting the turret head to swing around.

The upper surface or periphery of the supporting anvil or base 35 over which the film band passes and upon which the stylus impinges in cutting and impressing grooves on the film may be a plain stationary surface for ordinary classes of recording, but I prefer a movable surface. I accordingly provide a roller 167 mounted on a stud 168 adjacent the top of said anvil and positioned so that its upper surface forms a part of the surface of the anvil and is the part against which the stylus contacts (see Figs. 1 and 23). The upper surface of this roller 167 extends slightly above the curved upper surface of the anvil over which the film band is drawn as shown in Fig. 23. Roller 167 may have a plain surface or may be covered with a resilient face or surface, or may be locked against rotation or may be free to rotate with the traveling film band. A resilient surface such as described in my Patent No. 2,105,-741 may be provided. The roller may be locked by an arm 169 carried by a stub shaft 170 on the inside of the anvil or base. Shaft 170 extends exteriorly of the anvil and has a handle 171 fixed on its outer end for moving the arm 169 into and out of locking engagement with the roller. The handle may be held in moved position by engaging a raised portion of the dial or in any other suitable manner.

In Fig. 12, I have shown the manner in which a film band of comparatively short length is supported and its path of movement. In this form, the lower frame S of Fig. 1 is missing and the film band encircles the reels or drums 26 and 31 and the inner layer of the band after it leaves the reel 26 passes directly to the roller 32 and from this point follows the same path as the inner layer shown in Fig. 1.

My improved machine may also be used to move a strip of film forward and backward from end to end instead of an endless belt. In such a case, the reel or drum 31 would become a supply reel, the film strip being drawn from the top of said reel and pass downwardly under rollers 32 and 33 in the same vertical plane. From roller 33 the strip would pass angularly to and over roller 34 in a different vertical plane and then travel in the same plane over supporting anvil 35 and rollers 36 and 37. From roller 37 it would travel angularly to and over roller 38 which is in the same plane as the reels and rollers 32 and 33. After leaving roller 38 it would pass to and be taken up by reel or drum 26, which latter reel would then be held frictionally as by a spring washer impinging against the shouldered shaft 28 to drive the reel and slip on the shaft to compensate for the increasing diameter of the film windings. The film could be quickly rewound by a handle *h* on the supply reel 31 and the line spacing would require only the shifting of the pointer 149′ for moving the auxiliary carriage 111 and the turret head to the desired line position as indicated on the dial.

While I have shown a revolving turret head with interchangeable sound units for selectively bringing either of said units to operative position, I may use a single sound unit or head capable of both recording and reproducing, in which case the turret head would not be required, and the sound unit could be suitably pivoted for swinging movement on a stationary support mounted on the auxiliary carriage.

I may also omit the clip 86 on the endless band and the one-revolution clutch actuated thereby and manually shift the unit transversely of the film by shifting the pointer 149′ to move the auxiliary carriage 111 transversely of the film for impressing single line tracks parallel with the edges of the band and spaced side by side and thereby make endless tracks for each circuit of the film band. A different subject may then be impressed on each line, such as music, thereby providing a film band adapted for automatic coin-operated mechanism. My improved machine with such a band could be mounted in a cabinet with the pointer 149' and dial exposed for indicating the line position desired.

The mounting of the recording sound unit 118 and the reproducing unit 118' on the swingable turret head permits either of said units to be readily moved into operative position over the supporting anvil 35. The recording unit 118 is provided with the necessary tensioning means comprising the spring 125 and the pressing arm 126. The reproducing unit 118' is pivotally mounted on the link member 123 to give said unit the necessary flexibility and to permit it to fall by gravity upon the track and the weight 129 provides the necessary pressure to enable the stylus to engage the walls of the groove or track. No further adjustment of this unit 118' is necessary.

It will be understood that both sound units 118 and 118' might be replaced with two units that are capable of both recording and reproducing, one of which latter units could be used as a "spare" for use when needed.

I claim:

1. In a sound recording and reproducing machine, a casing, an endless traveling film band, means for moving said film band including a motor and drive shaft operatively connected thereto, a main carriage slidably mounted on said casing, means operatively connected to said drive shaft for sliding said main carriage including a feed screw on the casing operatively connected to the drive shaft and a bar on the main carriage having a screw-threaded semi-circular portion adapted to engage the threads on the feed screw, an auxiliary carriage slidably supported on the main carriage, means for sliding said auxiliary carriage, a turret head rotatably mounted on said auxiliary carriage, a recording sound head pivotally supported on said turret head and having a stylus adapted to be vibrated and pressed into the film band to form a sound groove therein and means for adjustably tensioning the pressure of the stylus upon the film band including a spring plate fixed on said turret head and a pivotal bar mounted on and across the pivotal support of the sound head adapted to be pressed downwardly by said spring plate against said support.

2. In a sound recording and reproducing machine, a casing, an anvil fixed on said casing, an endless film band adapted to travel over said anvil, a metal clip carried by said endless band, means for moving said film band including a motor and drive shaft operatively connected thereto, a main carriage slidably mounted on said casing, means operatively connected to said drive shaft for sliding said main carriage, an auxiliary carriage slidably supported on the main carriage, automatically actuated means for sliding said auxilary carriage, a cylindrical body mounted on said auxiliary carriage, and a recording sound head pivotally supported on said cylindrical body and having a stylus adapted to be vibrated and pressed into the film band to form a sound groove therein said automatically actuated means including a rockable arm in the path of movement of the clip on said endless band and adapted to be tripped thereby, a clutch device operatively connected to said rockable arm, a cam wheel operatively connected to said clutch device, said wheel being formed with an angularly disposed groove on its periphery, a forked lever pivotally supported on the anvil and having a pin on one end disposed in said groove and its other forked end engaging a fixed portion of said auxiliary carriage whereby movement of the cam wheel is imparted to said auxiliary carriage.

3. In a sound recording and reproducing machine, a casing, an anvil fixed on said casing, an endless film band adapted to travel over said anvil, a metal clip carried by said endless band, means for moving said film band including a motor on said casing and a drive shaft operatively connected thereto, a carriage member slidably supported on the casing, a sound head supported on said carriage and having a stylus adapted to be vibrated and pressed into the film band to form a sound groove therein and automatically actuated means for sliding said carriage including a cam wheel on the anvil provided with a groove on its periphery, a clutch device operatively connected to said cam wheel including a bell crank having a cam member on one arm thereof, a rotatable disc carrying a spring finger adapted to be engaged by said cam member for holding said disc against rotation, a lever having one end connected to said disc and its other end operatively connected to said cam wheel, means for moving said finger out of engagement with said disc including a rockable arm having a hook in the path of movement of said clip on the film band, means of connection between said rockable arm and said finger including a movable lever having one end operatively connected to the rockable arm and its other end connected to said bell crank.

JACOB M. KUHLIK.

REFERENCES CITED

The following references are of record in the file of this patent:

UNITED STATES PATENTS

| Number | Name | Date |
|---|---|---|
| 502,382 | Randall | Aug. 1, 1893 |
| 1,001,748 | Forrest | Aug. 29, 1911 |
| 1,051,475 | Wilson et al. | Jan. 28, 1911 |
| 1,607,004 | Kramer | Nov. 16, 1926 |
| 1,905,746 | Peets | Apr. 25, 1933 |
| 1,947,290 | Fonda | Feb. 13, 1934 |
| 2,006,660 | Van Der Woude | July 2, 1935 |
| 2,014,495 | Goldhammer et al. | Sept. 17, 1935 |
| 2,066,041 | Kiel | Dec. 29, 1936 |
| 2,087,135 | Wielage | July 13, 1937 |
| 2,105,661 | Kleffel | Jan. 18, 1938 |
| 2,115,503 | Von Mihaly | Apr. 26, 1938 |
| 2,141,804 | Thompson et al. | Dec. 27, 1938 |
| 2,142,563 | Harris | Jan. 3, 1939 |
| 2,167,817 | Smith | Aug. 1, 1939 |
| 2,168,792 | Daniel | Aug. 8, 1939 |
| 2,173,048 | Von Madaler et al | Sept. 12, 1939 |
| 2,183,117 | Daniel | Dec. 12, 1939 |
| 2,191,691 | Woolf | Feb. 27, 1940 |
| 2,205,058 | Calvert | June 18, 1940 |
| 2,253,302 | Kiel | Aug. 19, 1941 |
| 2,259,631 | Flood, Jr. | Oct. 21, 1941 |
| 2,273,391 | Yerkovich | Feb. 17, 1942 |
| 2,280,067 | Eggert et al. | Apr. 21, 1942 |
| 2,292,856 | Woolf et al. | Aug. 11, 1942 |
| 2,318,828 | Yerkovich | May 11, 1943 |
| 2,328,597 | Woolf | Sept. 7, 1943 |
| 2,341,468 | Neumann | Feb. 8, 1944 |